United States Patent [19]

Jenney et al.

[11] 3,867,125

[45] Feb. 18, 1975

[54] COMPOSITION FOR AND METHOD OF DEFOLIATION

[75] Inventors: John William Jenney, Montebello; Dennis Ambrose Donaghu, Pleasant Hill, both of Calif.; Louis Peter Cartsunis, Oklahoma City; Donald Sylvester Batchelor, Norman, both of Okla.

[73] Assignee: Ken-Mcgee Chemical Corp., Oklahoma City, Okla.

[22] Filed: Feb. 8, 1973

[21] Appl. No.: 330,691

[52] U.S. Cl. .................................... 71/69, 71/128
[51] Int. Cl. ............................................. A01n 11/00
[58] Field of Search ............................. 71/69, 128

[56] References Cited
UNITED STATES PATENTS 1,534,289    4/1925    Teppet ................................. 71/65

3,645,895    2/1972    Peterson et al. ..................... 71/69 X

OTHER PUBLICATIONS

Brit. Pat. 928,175. Chem. Abst. Vol. 59(1963) 6920e.

*Primary Examiner*—Lewis Gotts
*Assistant Examiner*—Catherine L. Mills
*Attorney, Agent, or Firm*—William G. Addison

[57] ABSTRACT

This invention relates to a composition of matter for and method of defoliating plants such as, for example, cotton. More particularly, this invention relates to a fire retardant defoliant comprising an aqueous solution of an alkali metal chlorate, alkali metal carbonate and urea, and a method of using the same.

10 Claims, No Drawings

COMPOSITION FOR AND METHOD OF DEFOLIATION

BACKGROUND OF THE INVENTION

It has been known for sometime that an aqueous solution of an alkali metal chlorate is an effective defoliant. Sodium chlorate is low in cost and readily available, therefore, it generally is preferred.

Defoliation of plants at certain stages in their growth has many advantages. For example, in the case of cotton plants defoliation at a certain stage in their growth exposes the lower cotton bolls to sunlight for ripening purposes and also is desirable from the standpoint of efficient picking. Obviously, of course, if the cotton is picked by hand the bolls would be more readily discernible on a plant that had been defoliated. Moreover, the defoliation is particularly important when the cotton is machine picked.

Generally, machine cotton pickers strip the plant of both leaves and the cotton bolls, thus necessitating a subsequent separation step to recover the cotton from the leaves. Numerous other types of plant life frequently are defoliated to facilitate harvest such as, for example, citrus trees, stringbean plants, soybean plants and the like.

Sodium chlorate, however, is a strong oxidizer and greatly accelerates the burning rate of flammable matter. It is for this reason that sodium chlorate rarely is used alone as a defoliant because the fire hazard it creates is too great to be tolerated. It has been known, heretofore, to use sodium carbonate as a fire retardant additive to solutions of sodium chlorate. An example of such a combination is disclosed in U.S. Pat. No. 1,534,289.

U.S. Pat. No. 2,704,243 discloses various boron containing compounds for use as fire retardant additives to chlorate solutions. Examples of such boron containing compounds include boric acid, sodium pentaborate and certain other polyborates. However, such boron containing compounds are expensive, thus, necessarily increasing the cost of the defoliant. Further, boron compounds, even in low concentration, frequently are toxic to plant life.

In U.S. Pat. No. 1,914,969 it is suggested that certain alkaline earth metal chlorides such as, for example, calcium chloride, are effective fire retardant additives for sodium chlorate solutions. Obviously, of course, continued use of such additives will necessarily result in contamination of the soil with chlorides.

More recently in U.S. Pat. No. 2,749,227 it is suggested that the addition of sodium metaborate to sodium chlorate imparts satisfactory fire resistant properties to the composition and enhances the defoliant action of the sodium chlorate.

It also is reported that certain fertilizer compounds have been added to sodium chlorate to decrease the fire hazard. Examples of such compounds are urea and agricultural nitrogen-phosphate products such as 10-3-4-0. There is still used, however, for an improved, low cost fire retardant chlorate defoliant.

SUMMARY OF THE INVENTION

An improved fire retardant defoliant and method of using the same now has been discovered. Broadly, the present invention comprises the discovery that the combination of an alkali metal carbonate and urea impart greater fire retardancy to a sodium chlorate solution than do either of them alone. The reason for this synergistic effect is not understood and the inventors do not wish to be bound by any particular theory.

The fire retardant defoliant of the present invention comprises an aqueous solution of an alkali metal chlorate, alkali metal carbonate and urea. The combination of alkali metal carbonate and urea are present in an amount sufficient to provide a ratio of such combination to chlorate within the range of from about 0.2:1 to 1.2:1 and a ratio of carbonate to urea within the range of from about 1:4 to 4:1. The alkali metal chlorate is present in an amount of from about 1 to 30 percent by weight.

It also has been discovered in accordance with this invention that cotton and other plants may be defoliated with an aqueous solution of an alkali metal chlorate, an alkali metal carbonate and urea. Further, there is substantially no fire hazard when plants are defoliated in accordance with the present invention.

DETAILED DESCRIPTION OF THE INVENTION

The defoliant of the present invention comprises an aqueous solution of an alkali metal chlorate. The alkali metal chlorates contemplated herein include sodium, potassium and lithium chlorate. For economic reasons sodium chlorate is the preferred alkali metal chlorate.

The alkali metal chlorate may be present in an amount of from about 1 percent to as high as 30 percent by weight. As those versed in the art will appreciate, the chlorate solution generally is shipped in a concentrated form for convenience and to reduce handling cost, thus, the solutions generally are sold and transported in concentrations of from about 5 to 30 percent by weight sodium chlorate. The chlorate solution is applied, however, in substantially lower concentrations. Indeed, sodium chlorate has been found to be effective when applied in concentrations as low as 0.5 percent. Generally, however, the chlorate is applied in concentrations of from about 1 to about 8 percent by weight. A particularly preferred concentration for application to plants is in the range of from about 1 to about 4 percent by weight.

It has been discovered that when urea and an alkali metal carbonate are added to chlorate solutions in certain specific ratios, they act synergistically providing an improved fire retardant defoliant. The alkali metal carbonates contemplated herein include sodium, potassium and lithium carbonate. The preferred carbonate is sodium carbonate.

It is essential that the combination of alkali metal carbonate and urea be present in an amount sufficient to provide a ratio of such combination to chlorate within the range of from about 0.2:1 to 1.2:1 and a ratio of carbonate to urea within the range of from about 1:4 to 4:1.

Obviously, of course, greater or lesser amounts of carbonate or urea may be used. However, if the alkali metal carbonate and urea are not present in an amount within the foregoing ranges substantially no synergism is observed. It is preferred that the sodium carbonate and urea be present in an amount sufficient to provide a ratio of carbonate and urea to chlorate within the range of from about 0.5:1 to 1:1 and particularly good results have been obtained at a ratio of about 0.75:1.

The ratio of carbonate to urea also is critical and must be within the range of from about 1:4 to 4:1. The exact ratio required to obtain optimum fire retardancy will vary depending upon the concentration of the alkali metal chlorate. Generally, it is preferred to use a ratio of carbonate to urea within the range of from about 1:3 to 3:1 and particularly good results are obtained at ratios of from about 1:2 to 2:1.

An example of a preferred defoliant composition for direct application to plants comprises an aqueous solution containing from 1 to about 4 percent by weight sodium chlorate in admixture with sufficient sodium carbonate and urea to provide a ratio of said carbonate and urea to chlorate within the range of from about 0.75:1 to 1:1 and a ratio of carbonate to urea within the range of from about 1:3 to 3:1.

The concentrated defoliant usually is diluted with water prior to its application to plants. The dilute defoliant, containing from about 1 to 8 percent by weight sodium chlorate, generally is applied in amounts of about 10 gallons per acre by aerial spray or in amounts of from about 10 to 30 gallons per acre by ground spray. As those versed in the art will appreciate the exact formulation and amount applied will vary depending upon the area, type of plant to be defoliated and the like.

The fire retardant defoliant of the present invention also may include additional additives, as those versed in the art will appreciate. Examples of such additional additives include surfactants, corrosion inhibitors and the like.

Alkali metal chlorate solutions can be corrosive if used in aluminum tanks or equipment, therefore, the inclusion of a corrosion inhibitor is particularly desirable. A preferred corrosion inhibitor is phosphoric acid. The phosphoric acid usually is added to the concentrated solution in an amount sufficient to provide from about 0.07 to 0.15 pounds acid per gallon of chlorate solution.

EXAMPLE I

A solution of sodium chlorate is prepared containing sodium chlorate in a concentration of 0.33 pounds per gallon. The sodium chlorate solution then is divided into three equal portions. To one portion of the solution, designated A, is added 0.25 pounds of urea per gallon of solution. To another portion of the solution, designated B, is added 0.25 pounds of sodium carbonate per gallon of solution. To the third portion, designated C, is added a mixture of 0.125 pounds sodium carbonate and 0.125 pounds urea per gallon of solution.

To determine the effectiveness of the additives as flame retardants the following test is performed. A number 4 Whatman filter paper, 3 inches wide by 6.5 inches in length, is soaked in one of the solutions 5 minutes and air dried for 24 hours in a horizontal position. Thereafter, a match flame is applied to the bottom edge of the paper strip while it is held in a vertical position and the time required to burn the paper is measured. The foregoing test is repeated using additional strips of paper of the same type and size for each of the other portions. The time required to burn the papers soaked in solutions A, B and C is 10, 60 and 106 seconds respectively. Thus, it is seen that the time required to burn the strip soaked in solution C is substantially greater than that for one soaked in either A or B, clearly deomonstrating the synergistic effect obtained with a mixture of an alkali metal carbonate and urea.

EXAMPLE II

Additional tests are performed with various solutions having the compositions as set forth in Table I below. Each of the solutions is tested for fire retardancy in accordance with the procedure set forth in Example I. Further, strips of bleached muslin cloth, three inches in width and 16 inches in length also are soaked in the solutions for 60 minutes, air dried for 24 hours and tested. The results of the tests are as set forth in Table I below.

TABLE I

Sodium Chlorate Solutions

| Test | Lb/Gallon of Solution | | | Burning Time (Seconds) | |
|---|---|---|---|---|---|
| | NaClO$_3$ | Urea | Na$_2$CO$_3$ | Cloth | Paper |
| 1 | — | — | — | 21 | 13 |
| 2 | 0.33 | — | — | 10 | 6 |
| 3 | 2.00 | — | — | 10 | 6 |
| 4 | 2.00 | 1.00 | — | * | 150 |
| 5 | 2.00 | — | 1.00 | 90 | 73 |
| 6 | 2.00 | 0.50 | 0.25 | * | * |
| 7 | 2.00 | 0.50 | 0.50 | * | * |
| 8 | 2.00 | 0.75 | 0.25 | * | * |
| 9 | 2.00 | 1.50 | — | 150 | 150 |
| 10 | 2.00 | — | 1.50 | 101 | 45 |
| 11 | 2.00 | 0.50 | 1.00 | 204 | 125 |
| 12 | 2.00 | 0.75 | 0.75 | * | * |
| 13 | 2.00 | 1.00 | 0.50 | * | * |
| 14 | 0.33 | 0.25 | — | 14 | 10 |
| 15 | 0.33 | — | 0.25 | 105 | 60 |
| 16 | 0.33 | 0.083 | 0.167 | 150 | 94 |
| 17 | 0.33 | 0.125 | 0.125 | 158 | 106 |
| 18 | 0.33 | 0.167 | 0.083 | 154 | 124 |

*Burning time of material is indeterminate; sustained application of flame needed to support burning of material.

Clearly, the above results demonstrate the enhanced fire retardancy obtained with a combination of an alkali metal carbonate and urea.

What is claimed is:

1. A defoliant comprising an aqueous solution containing an alkali metal chlorate in an amount of from about 1 to about 30 percent by weight, an alkali metal carbonate and urea, said carbonate and urea being present in an amount sufficient to provide a ratio of carbonate and urea to chlorate within the range of from about 0.2:1 to 1.2:1 and a ratio of carbonate to urea within the range of from about 1:4 to 4:1.

2. The defoliant of claim 1 wherein the ratio of carbonate to urea is within the range of from about 1:2 to 2:1.

3. The defoliant of claim 1 wherein the ratio of carbonate and urea to chlorate is within the range of from about 0.50:1 to 1:1.

4. The defoliant of claim 1 wherein the aqueous solution contains from about 0.07 to 0.15 pounds of phosphoric acid per gallon of solution.

5. The defoliant of claim 4 wherein the alkali metal chlorate is sodium chlorate; the alkali metal carbonate is sodium carbonate, the ratio of carbonate and urea to chlorate is within the range of from about 0.5:1 to 1:1 and the ratio of carbonate to urea is within the range of from about 1:2 to 2:1.

6. A method of preparing a flame retardant defoliant comprising: admixing an aqueous solution containing from about 1 to about 30 percent by weight of an alkali metal chlorate, with an alkali metal carbonate and urea, said carbonate and urea being provided in an amount sufficient to provide a ratio of carbonate and urea to chlorate within the range of from about 0.2:1 to 1.2:1 and a ratio of carbonate to urea within the range of from about 1:4 to 4:1.

7. The method of claim 6 wherein the alkali metal chlorate is sodium chlorate.

8. The method of claim 6 wherein the alkali metal chlorate is sodium chlorate and the alkali metal carbonate is sodium carbonate.

9. The method of claim 8 wherein the ratio of carbonate and urea to chlorate is within the range of from about 0.50:1 to 1:1.

10. The method of claim 9 wherein the ratio of carbonate to urea is within the range of from about 1:2 to 2:1.

* * * * *

UNITED STATES PATENT OFFICE
CERTIFICATE OF CORRECTION

Patent No. 3,867,125            Dated February 18, 1975

Inventor(s) John William Jenney et al

It is certified that error appears in the above-identified patent and that said Letters Patent are hereby corrected as shown below:

The assignee is Kerr-McGee Chemical Corporation

Column 1, line 59, delete "used" and insert -- need --

Signed and sealed this 13th day of May 1975.

(SEAL)
Attest:

RUTH C. MASON
Attesting Officer

C. MARSHALL DANN
Commissioner of Patents
and Trademarks